April 17, 1928.  W. WAIT, JR  1,666,761
COMBINATION SEAT AND CONTROL MECHANISM FOR AIRCRAFT
Filed April 7, 1927   2 Sheets-Sheet 1
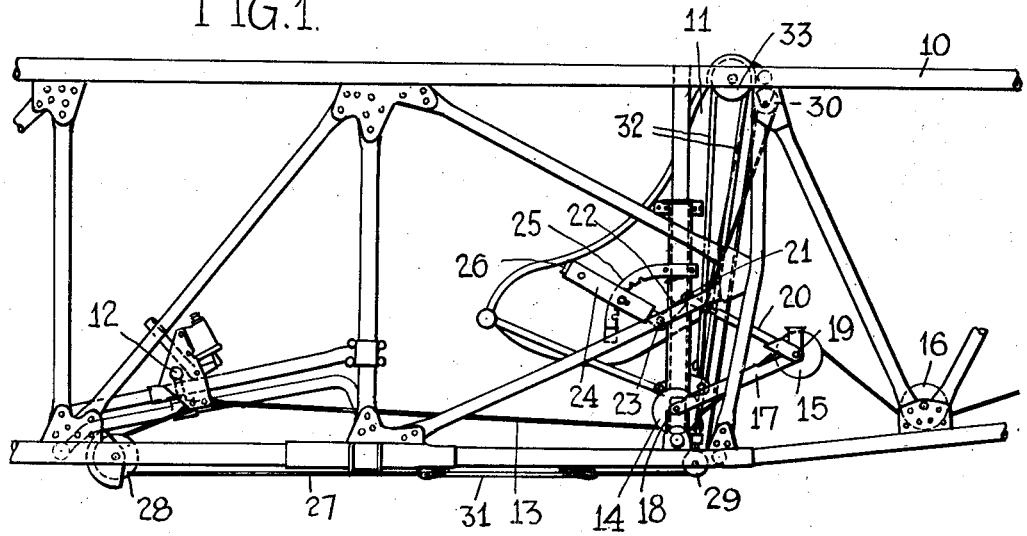
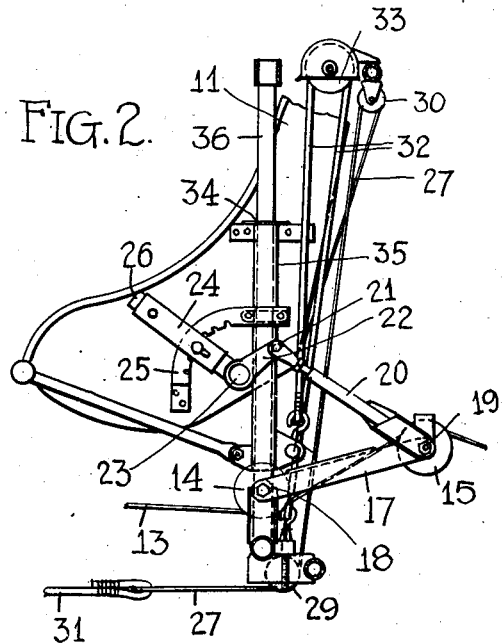
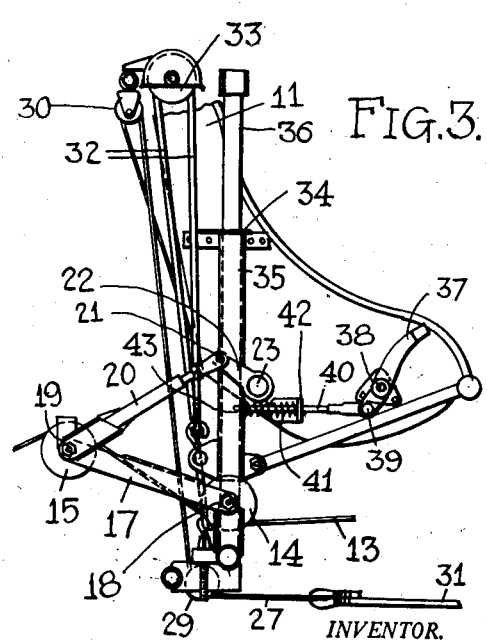
INVENTOR.
WILLIAM WAIT JR.
BY
ATTORNEYS.

April 17, 1928.  1,666,761
W. WAIT, JR
COMBINATION SEAT AND CONTROL MECHANISM FOR AIRCRAFT
Filed April 7, 1927   2 Sheets-Sheet 2

INVENTOR.
WILLIAM WAIT JR.
BY
ATTORNEYS.

Patented Apr. 17, 1928.

1,666,761

UNITED STATES PATENT OFFICE.

WILLIAM WAIT, JR., OF GARDEN CITY, NEW YORK, ASSIGNOR TO CURTISS AEROPLANE & MOTOR COMPANY, INC., A CORPORATION OF NEW YORK.

COMBINATION SEAT AND CONTROL MECHANISM FOR AIRCRAFT.

Application filed April 7, 1927. Serial No. 181,745.

My invention relates to aircraft and is concerned more particularly with the seat and control mechanism thereof.

An object of the invention is to provide, in an aeroplane, an adjustable seat and an adjustable control surface operating device, said seat and said device being so related, one to the other, as to cause said device, as said seat is raised, to move toward said seat and vice versa.

A further object of the invention is to provide, in the connection between said seat and said control device, means for adjusting said control device independently of said seat, such independent adjustment being in addition to and in no way affecting the simultaneous and coordinated adjustment aforesaid.

A still further object of the invention is to provide a seat and control device arrangement in which the weight of the occupant is relied upon to lower the seat, and in which suitable tension devices are used to raise the seat, said seat being so connected with said control device as to cause it (the control device), regardless of its position of adjustment, to move with and in direct proportion to the adjustment accorded said seat.

An aeroplane or other aircraft having its seat and control surface operating device thus organized is advantageous in that the occupant of the seat can adjust the control device as desired, and after adjustment, can raise and lower the seat at will without disturbing or in any way altering the adjusted relationship between said control device and said seat.

Other objects and advantages of the invention will be hereinafter set forth.

In the drawings, wherein like reference characters denote like or corresponding parts, Fig. 1 is a side elevation of that part or portion of an aeroplane fuselage having installed therein the adjustable control device and the adjustable seat of my invention;

Fig. 2 is a side elevation of the adjustable seat;

Fig. 3 is a similar view looking at the opposite side of the seat;

Figure 4:
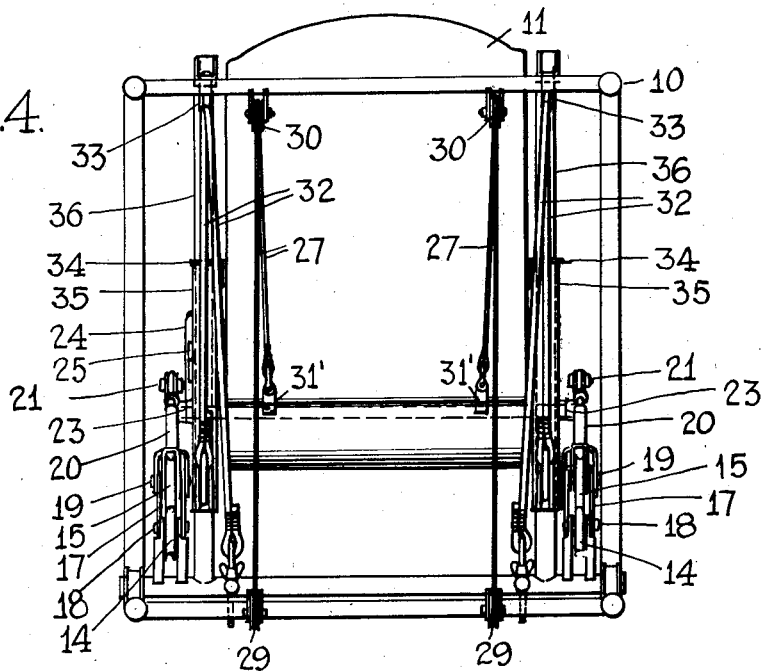
Fig. 4 is a rear elevation of the seat.
Figure 5:
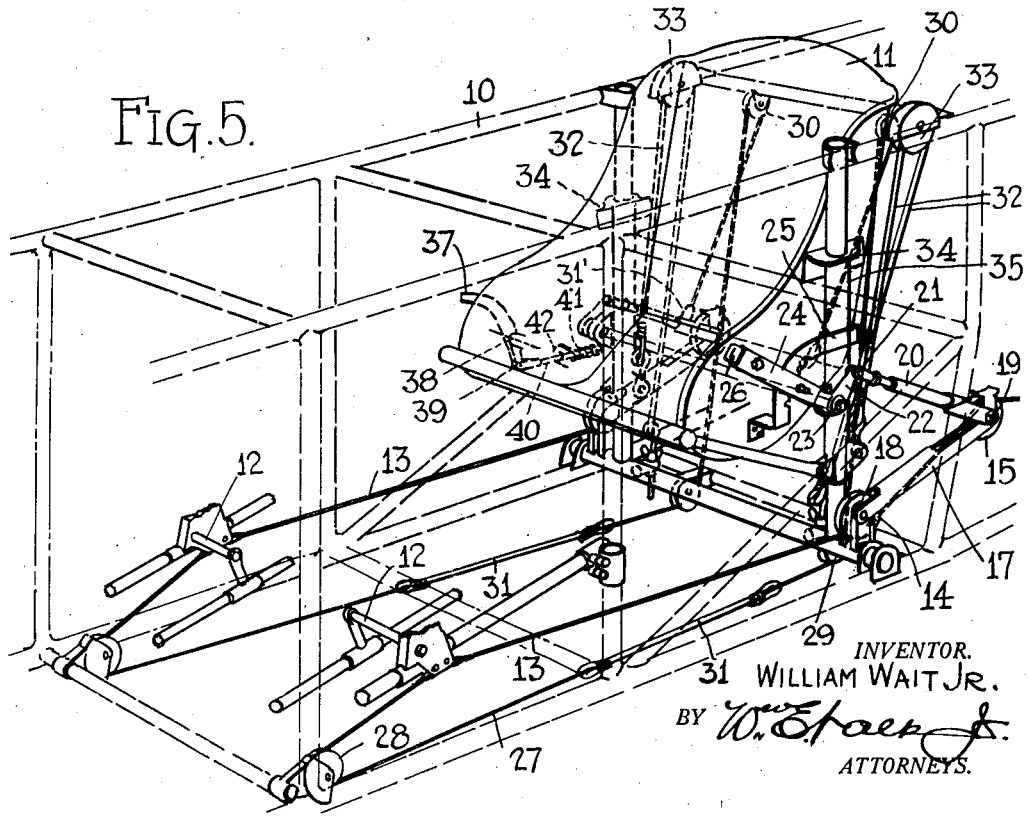
Fig. 5 is a perspective view of the structure illustrated in Fig. 1.

In the embodiment of the invention selected for illustration only the skeleton frame 10 of an aeroplane fuselage is shown. Within said frame 10 the vertically adjustable seat 11 and the control surface operating devices 12—12 are mounted. Said control surface operating devices 12—12 are slidable, back and forth, in a fore and aft direction, and are separately fastened as by control leads 13—13 to the control surface or surfaces (not shown). The constructional details of said control devices 12—12 are disclosed in my co-pending application Serial Number 156,592, filed December 23, 1926.

Each control lead 13, intermediately of its ends, is carried over and under, as the case may be, suitable pulleys 14, 15 and 16. The pulleys 15, in each instance, are vertically movable whereas the remaining two are in each instance fixed. By raising and lowering said pulleys 15 all slack in the separate control leads 13—13 is taken up.

The means for raising and lowering said pulleys 15 comprises spaced levers 17, pivoted as at 18, to the fuselage frame. Said levers 17 carry at their outer ends the pulleys 15 and have fastened thereto as at 19 suitable links 20 which may or may not be adjustable in length. These links 20 at their opposite ends, are pivotally fastened as at 21, to arms 22 carried by a shaft 23 extending thru and movable vertically with, as well as rotatable independently of, the vertically adjustable seat 11. As said arms 22 are both fastened to said shaft 23, and as the shaft 23 is movable vertically with said seat, as well as rotatable independently thereof, obviously as the seat 11 is vertically adjusted, or as said shaft 23 is independently rotated, the pulleys 15 are correspondingly vertically moved. An operating lever 24 fastened to the shaft 23 at one side of the seat 11, and having associated therewith a quadrant 25 and a cooperating latch 26, is provided as a means for rotating said shaft.

In addition to the connection between the control surface operating devices 12—12 and the control surface or surfaces (not shown) said devices 12—12 are also connected with the seat 11. This latter connection, which is in duplicate, comprises a cord or cable 27 which at one end is fastened to one or the other of the control surface operating devices 12. From their respective points of attachment to said devices 12 the cords or cables 27 extend forwardly and over pulleys 28 carried by the fuselage frame. From said pulleys 28 the cords or cables 27 extend rearwardly to pulleys 29 likewise mounted on the fuselage frame directly beneath the seat 11. From the pulleys 29 said cords or cables 27 extend upwardly behind the seat 11 to pulleys 30 mounted at the top of the fuselage frame, and at their opposite ends are fastened as at 31' to the bottom of the seat. Thus connected, the control surface operating devices 12—12, as the seat 11 is lowered, are moved in a forward direction as a result of and in direct proportion to the adjustment accorded said seat. To eliminate all slack in said cable connections a tension device 31 is interpolated in each. The weight of the occupant is relied upon to move said seat 11 in a downward direction when released.

The means for raising the seat 11 when released, comprises tension elastics 32—32. These elastics are placed behind the seat and are fastened at their opposite ends to the seat and to the fuselage frame. Intermediately of their ends, said elastics 32 are carried over pulleys 33 mounted within and at the top of the fuselage frame. Thus arranged, said elastics 32 exert at all times an upward pull on the seat 11 tending to move it in an upward direction when released.

The seat 11, at its opposite sides, has fastened thereto, as by brackets 34, suitable guide tubes 35. Said guide tubes 35 extend vertically and are adapted to slide vertically along suitable seat supports 36 fastened to the fuselage frame. The release mechanism for fastening the seat 11 in its adjusted position comprises a lever 37 pivotally fastened as at 38 at that side of the seat opposite to the lever 24. Said lever 37 has pivotally fastened thereto as at 39 a sliding latch bar 40 which, at its free end is adapted to engage in apertures (not shown) formed in one of the seat supports 36. A spring 41 bearing at one end against a guide 42 thru which the latch bar 40 extends and at its opposite end against a lug or pin 43 extending thru the latch bar, tends to urge said latch bar at all times into locking engagement with the apertures (not shown) of the seat support 36.

It will be seen from the above, that the seat 11 may be adjusted vertically within the fuselage frame, and that by and as a result of such vertical adjustment, the pulleys 15 carried by the levers 17 are either raised or lowered to either pull in or let out the control leads 13 engaging therewith. As the seat 11 is raised, the pulleys 15 are accordingly raised, and, since the control leads 13 are in effect shortened, the control surface operating devices 12 are pulled in a backward direction and toward the said seat. The opposite or lowering adjustment of the seat 11, by permitting the pulleys 15 to fall, lets out on the control leads 13, and thru the cable connection 17, simultaneously pulls the control devices 12 in a forward direction and hence away from the seat. To secure the independent adjustment of said control devices 12—12, the operating lever 24 may be either pulled back or pushed forwardly to thereby rotate the shaft 23 and thru its rotation raise or lower the pulleys 15 without in any way affecting the position of adjustment of the seat.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, in an aeroplane, of an adjustable seat, a control surface operating device, and means operable to move said device relatively to said seat as said seat is adjusted.

2. The combination, in an aeroplane, of an adjustable seat, a control surface operating device, and means operable to move said device relatively to said seat as said seat is vertically adjusted.

3. The combination, in an aeroplane, of a vertically adjustable seat, a control surface operating device, and means operable to move said device toward and away from said seat as said seat is vertically adjusted.

4. The combination in an aeroplane, of a vertically adjustable seat, a control surface operating device, means operable to move said device relatively to said seat as said seat is adjusted, and a lever operable to actuate said means and move said device independently of said seat adjustment.

5. The combination, in an aeroplane, of a seat support, a seat adjustable vertically relatively to said support, a control surface operating device adjustable toward and away from said support, and means carried by and movable with said seat to adjust said device independently thereof.

6. The combination, in an aeroplane, of a seat support, a seat adjustable vertically relatively to said support, a control surface operating device adjustable toward and away from said support, and an adjustable means for said device carried by and movable with said seat, said adjustable means being operable as said seat is adjusted to proportionately adjust said device and being operable whether or not said seat is adjusted to independently adjust said device.

7. The combination, in an aeroplane, of a vertically adjustable seat, a control surface operating device, a control lead fastened to said device, and an adjustable means for said device engaging with said control lead and operable as said seat is adjusted to proportionately adjust said device.

8. The combination, in an aeroplane, of a vertically adjustable seat, a control surface operating device adjustable toward and away from said seat, means operable as said seat is raised to move said device toward said seat, and means operable as said seat is lowered to move said device away from said seat.

9. The combination, in an aeroplane, of a vertically adjustable seat, a control surface operating device adjustable toward and away from said seat, and a connection extending between said seat and said device whereby the adjustment of the one is made responsive to the adjustment of the other.

10. The combination, in an aeroplane, of a vertically adjustable seat, a control surface operating device adjustable toward and away from said seat, a connection extending between said seat and said device whereby the adjustment of the one is made responsive to the adjustment of the other, and means associated with said connection for adjusting said device relatively to said seat without a corresponding adjustment of the latter.

11. The combination, in an aeroplane, of a vertically adjustable seat, a control surface operating device adjustable toward and away from said seat, means operable as said seat is raised to move said device toward said seat and a connection extending between said seat and said device whereby the adjustment of said device is made directly responsive to and directly proportional to the adjustment of said seat.

12. The combination, in an aeroplane, of a vertically adjustable seat, a control surface operating device movable toward and away from said seat, a control lead fastened to said device, means engaging with said control lead and operable as said seat is raised to move said device toward said seat, and means operable as said seat is lowered to move said device away from said seat, said last mentioned means having incorporated therein a tension means.

In testimony whereof I hereunto affix my signature.

WILLIAM WAIT, Jr.